(12) United States Patent
Liang et al.

(10) Patent No.: US 6,363,771 B1
(45) Date of Patent: Apr. 2, 2002

(54) EMISSIONS DIAGNOSTIC SYSTEM

(75) Inventors: Cho Y. Liang, Peoria; Steven R. McCoy, Washington, both of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/444,927

(22) Filed: Nov. 24, 1999

(51) Int. Cl.$^7$ .............................................. G01M 15/00
(52) U.S. Cl. .................... 73/23.31; 73/118.1; 73/117.3; 60/277; 340/439
(58) Field of Search .............................. 73/23.31, 23.32, 73/117.3, 118.1, 119 A; 340/438, 439; 60/276, 277

(56) References Cited

U.S. PATENT DOCUMENTS

| | | | |
|---|---|---|---|
| 4,403,473 A | | 9/1983 | Gladden |
| 5,651,247 A | | 7/1997 | Frankle |
| 5,785,937 A | * | 7/1998 | Neufert et al. ........... 423/213.2 |
| 5,809,774 A | * | 9/1998 | Peter-Hoblyn et al. ....... 60/274 |
| 5,809,775 A | | 9/1998 | Tarabulski et al. |
| 5,884,475 A | * | 3/1999 | Hofmann et al. ............. 60/274 |
| 5,976,475 A | * | 11/1999 | Peter-Hoblyn et al. ..... 423/212 |
| 6,063,350 A | * | 5/2000 | Tarabulski et al. .......... 423/212 |
| 6,125,629 A | * | 10/2000 | Patchett ....................... 60/286 |

FOREIGN PATENT DOCUMENTS

| | | |
|---|---|---|
| DE | 197 43 337 C 1 | 1/1999 |
| DE | 198 45 944 A1 | 6/1999 |
| DE | 198 56 366 C 1 | 4/2000 |
| EP | 0 849 443 A1 | 6/1998 |

* cited by examiner

Primary Examiner—George Dombroske
(74) Attorney, Agent, or Firm—Blackwell Sanders Peper & Martin

(57) ABSTRACT

An emissions diagnostic system is used with a compression ignition engine having an exhaust gas stream directed into an SCR catalyst capable of reducing $NO_x$ in the exhaust gas stream. The system comprises a tank for storing a solution of urea, a pump in fluid communication with the tank for drawing the solution of urea from the tank, a valve in fluid communication with the pump and the exhaust gas stream for receiving the solution of urea from the pump, an air pump connected to the valve for providing air into the valve for mixing with the solution of urea, the valve for spraying the solution of urea into the exhaust gas stream, a sensor for sensing the level of $NO_x$ emissions emitted by the SCR catalyst, and a control module connected to the sensor for determining whether the level of $NO_x$ emissions is at an acceptable level.

12 Claims, 2 Drawing Sheets

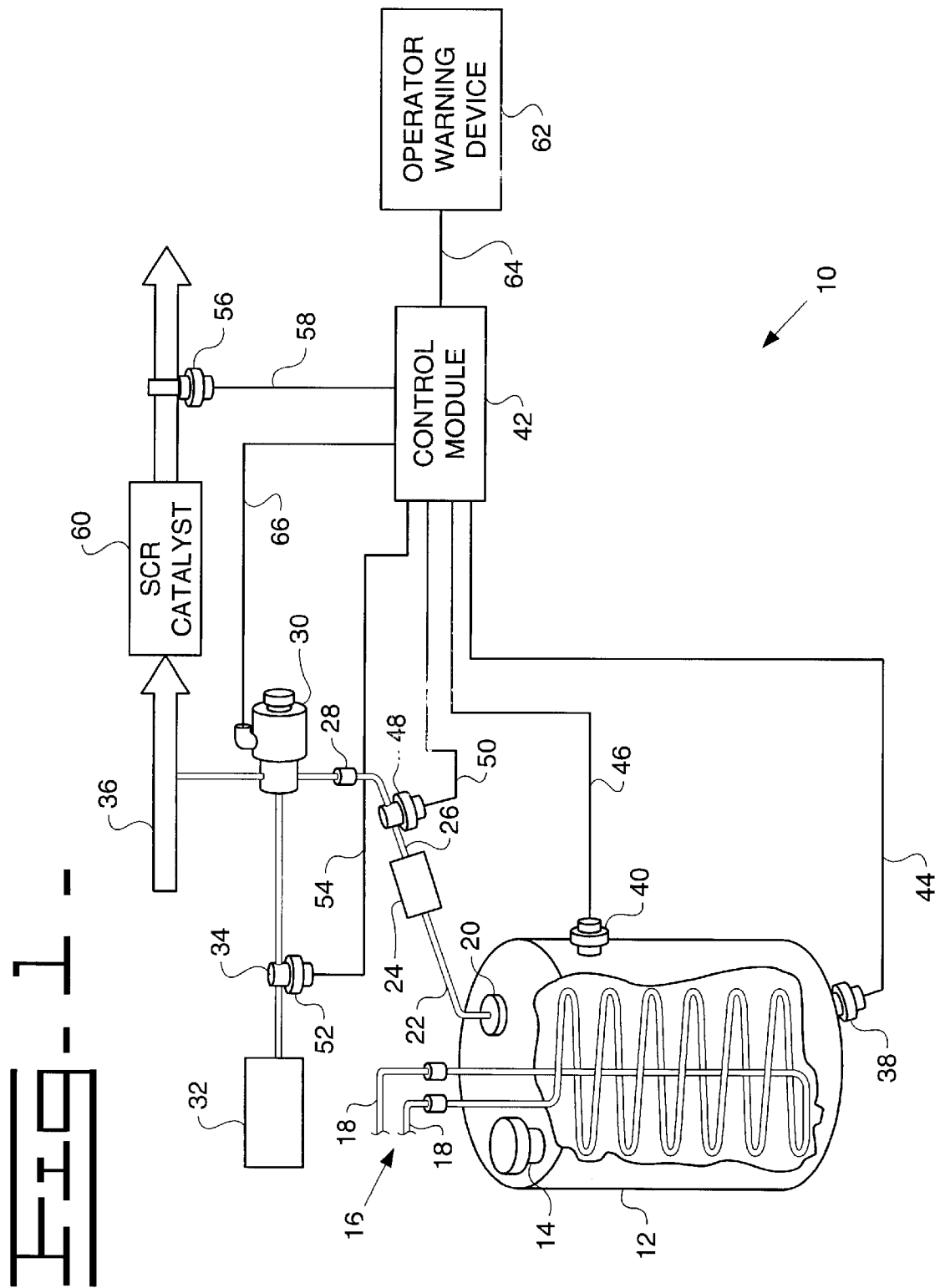

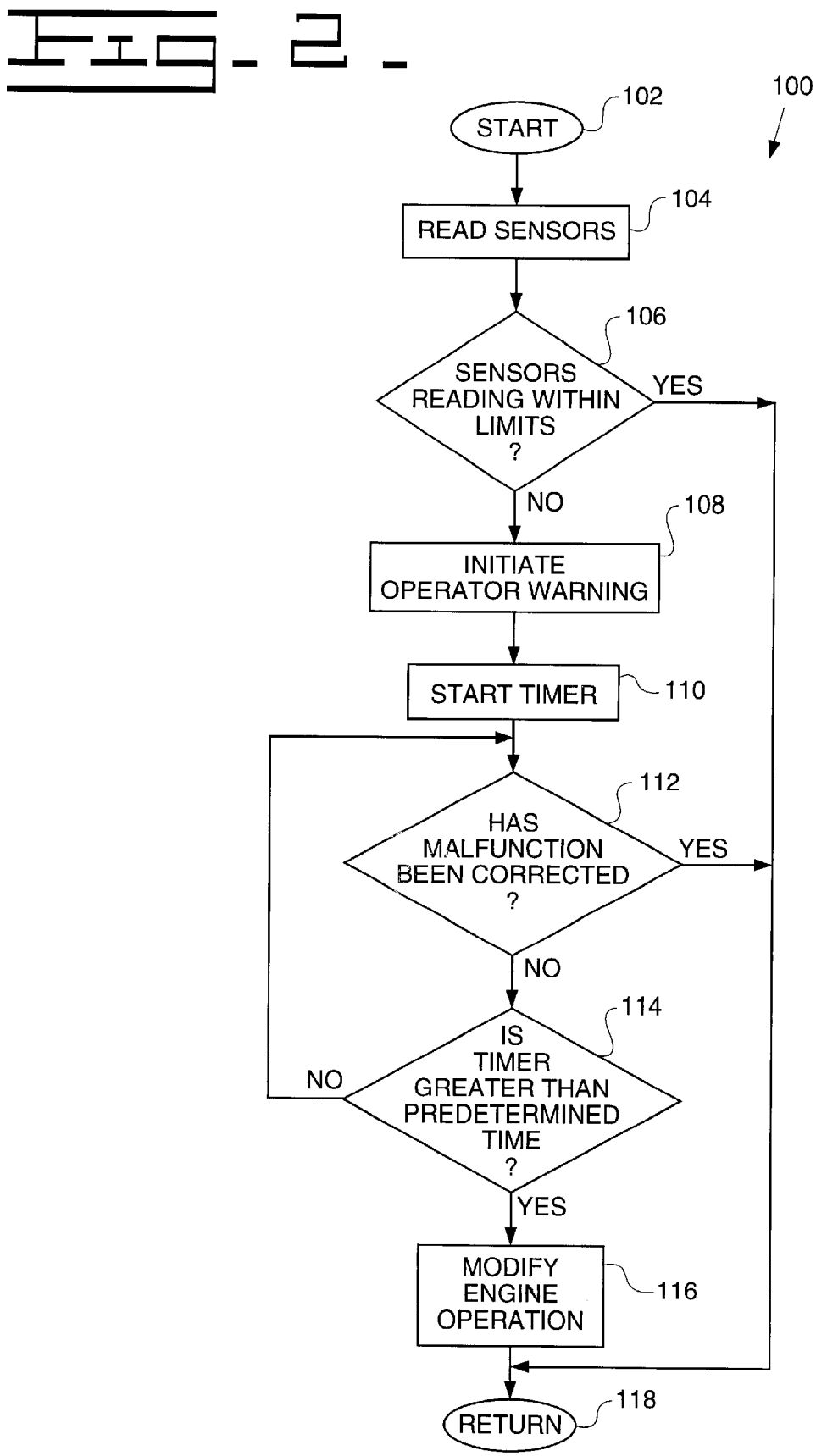

EMISSIONS DIAGNOSTIC SYSTEM

TECHNICAL FIELD

The present invention relates generally to emission control systems for electronically controlled compression ignition engines, and more particularly to an emissions control system having an emissions diagnostic system.

BACKGROUND ART

Compression ignition engines provide advantages in fuel economy, but produce and emit both $NO_x$ (nitrogen oxides) and particulates during normal operation. When primary measures (actions that affect the combustion process itself, e.g., exhaust gas recirculation and engine timing adjustments) are taken to reduce one, the other is usually increased. Thus, combustion conditions selected to reduce pollution from particulates and obtain good fuel economy tend to increase the output of $NO_x$. Current and proposed regulations and legislation challenge manufacturers to achieve good fuel economy while at the same time require the reduction of the emissions of particulates and $NO_x$.

In order to meet such requirements or restrictions a method known as SCR (selective catalytic reduction) has been used for reducing the emission of $NO_x$. The SCR method consists of injecting gaseous ammonia $NH_3$, ammonia in aqueous solution or urea, into the exhaust gas system of the compression ignition engine as a reduction agent. Originally, SCR depended on the use of ammonia, which has safety problems associated with its storage and transport. Aqueous urea and solid reagents are safer, but were not initially practical for many SCR applications, particularly mobile $NO_x$ sources, due to the difficulty in converting the aqueous urea or the solid reagents from solution or solid form to active gaseous species, typically $NH_3$ and $HNCO$ radicals.

Because of the heightened awareness and concern with emissions, there was a need for a safe, economical and effective answer to the problems associated with SCR, particularly for mobile compression ignition engines such as diesel engines. Where SCR catalysts had been employed to limit $NO_x$ emissions from compression ignition engines, one had to deal with either the dangers of ammonia leakage or using a urea solution or other reagent and risk fouling the catalysts under most conditions. The first limited attempts to use urea for compression ignition engines sometimes required the use of large pyrolization chambers or other devices following the point of urea introduction into the exhaust from the engine. Although there were initial problems in using urea, such problems have been for the most part solved.

However, such prior art urea based emissions control systems generally have no diagnostic system to insure that the system is operating properly and that the system has not been tampered with in an attempt to override the emissions system. One such prior art emissions control system has the capability of detecting the level of urea in the system's urea storage tank. When the storage tank is empty the system will retard timing of the engine to thereby decrease the $NO_x$ emissions to an acceptable level. Since fuel consumption is increased as the timing is retarded, the operator will have an incentive to refill the urea storage tank as quickly as possible in order to return the engine to a higher fuel economy level. Although such a prior art system is useful, it does not eliminate the possibility of misuse or tampering. For example, since urea is relatively expensive, the operator may attempt to defeat the system by simply filling the urea tank with water. In such an event the operator would achieve the desired fuel economy without having to purchase urea, but at the expense of increased emissions.

While the prior art systems generally perform acceptably while there is $NO_x$ reducing reagent present in the storage tank, the prior art systems do effectively handle the situations where the storage tank is empty of urea or when the storage tank is filled with a substance other than urea. It would be preferable to have a diagnostic system that could insure that the emissions system is operating properly and the system has not been purposely defeated or tampered.

DISCLOSURE OF THE INVENTION

The present invention relates to an emissions diagnostic system for a compression ignition engine having an exhaust gas stream which is directed into an SCR catalyst capable of reducing $NO_x$ in the exhaust gas stream. The system comprises a tank for storing a solution of urea, a pump in fluid communication with the tank for drawing the solution of urea from the tank, a valve in fluid communication with the pump and the exhaust gas stream for receiving the solution of urea from the pump, an air pump connected to the valve for providing air into the valve for mixing with the solution of urea, the valve for spraying the solution of urea into the exhaust gas stream, a sensor for sensing the level of $NO_x$ emissions emitted by the SCR catalyst, and a control module connected to the sensor for determining whether the level of $NO_x$ emissions is at an acceptable level.

In another aspect of the invention relates to an emissions diagnostic system for reducing $NO_x$ emissions from an exhaust gas stream of a compression ignition engine with the exhaust gas stream being passed through an SCR catalyst effective for selective catalytic $NO_x$ reduction. The system comprises a tank for storing a solution of urea, the tank further having a heat source to apply heat to the solution of urea, a pump connected to the tank for pumping the solution of urea from the tank, a valve connected to the pump and exhaust gas stream, the valve for receiving the solution of urea from the pump, an air pump connected to the valve for providing air into the valve for mixing with the solution of urea, the valve for controllably spraying the solution of urea into the exhaust gas stream, a sensor associated with an output of the SCR catalyst for sensing the level of $NO_x$ emissions emitted by the SCR catalyst, and a controller connected to the sensor for determining whether the level of $NO_x$ emissions is within a predetermined range.

Other aspects and advantages of the present invention will be apparent to those skilled in the art upon reading the following detailed description in connection with the drawings and appended claims.

BRIEF DESCRIPTION OF THE DRAWINGS

The invention will be better understood and its advantages more apparent from the following detailed description, especially when read in light of the accompanying drawings, wherein:

FIG. 1 is a system level block diagram of a preferred embodiment of the present invention; and FIG. 2 is a flowchart of the software control employed in connection with a preferred embodiment of the present invention.

BEST MODE FOR CARRYING OUT THE INVENTION

Referring now to the drawings, FIG. 1 illustrates an emissions diagnostic system 10 constructed according to the present invention. The emissions diagnostic system 10 has a vessel or urea storage tank 12 which includes a fill port 14. The fill port 14 is used to fill the tank 12 with an urea solution (not shown). The tank 12 includes a heating device 16, which in a preferred embodiment, includes a heating element 18 having a hollow core that permits hot exhaust gas to travel through in order to heat the heating element 18. A portion of the heating device 16 is preferably installed within the tank 12 to efficiently transfer heat from the heating device 16 to the urea solution contained in the tank 12. The heating device 16 may take different forms, for example, the heating device 16 may be a resistive element that generates heat when electrical current is provided. Additionally, the heating device 16 may be attached directly to the outside of the tank 12.

The tank 12 further includes an outlet port 20 having an outlet conduit 22 connected to a pump 24. The pump 24 draws the urea solution from the tank 12 through the conduit 22 and the pump 24 then pressurizes the urea solution. The pressurized solution is then provided through a conduit 26 to a pressure regulator 28. The pressure regulator 28 insures that the pressurized urea solution is maintained at or below a predetermined pressure. The urea solution flows from the pressure regulator 28 to a valve 30. An air pump 32 is also connected to the valve 30 by a conduit 34. The pressurized urea solution is sprayed from the valve 30 to introduce the urea solution into an exhaust gas stream 36 from a compression ignition engine (not shown).

The tank 12 further includes a fluid level sensor 38 which is used to sense the level of the urea solution within the tank 12. A temperature sensor 40 is also associated with the tank 12 to determine the temperature of the urea solution within the tank 12 or of the tank 12. The fluid level sensor 38 is connected to a controller or control module 42 by an electrical connection 44. The fluid level sensor 38 is capable of providing a signal over the connection 44 to the control module 42 indicative of the level of fluid in the tank 12. Additionally, the temperature sensor 40 is connected to the control module 42 via a wire 46. The temperature sensor 40 is used to produce a signal over the wire 46 which is indicative of the temperature of the urea solution within the tank 12.

The control module 42 can take many forms including a computer based system, a microprocessor based system including a microprocessor, a microcontroller, or any other control type circuit or system. The control module 42 may include memory for storage of a control program for operating and controlling the emissions diagnostic system 10 of the present invention and other memory for temporary storage of information.

A pressure sensor 48 is connected to the conduit 26 for sensing the pressure of the urea solution being pumped from the pump 24 to the pressure regulator 28. The sensor 48 is connected to the control module 42 by a wire 50. The sensor 48 provides a signal over the wire 50 indicative of the pressure of the urea solution. Another pressure sensor 52 is connected to the conduit 34 for sensing the pressure of the air being provided from the air pump 32 to the valve 30. The sensor 52 is also connected to the control module 42 via an electrical connection 54. The sensor 52 produces an air pressure signal over the connection 54. An $NO_x$ sensor 56 is positioned at an output end of an SCR catalyst 60 and is also connected to the control module 42 by a wire 58. The $NO_x$ sensor 56 is used to provide a signal indicative of the level of $NO_x$ emissions being produced by the SCR catalyst 60. The $NO_x$ sensor 58 is used to continually monitor the level of $NO_x$ emissions.

Also connected to the control module 42 is an operator warning device 62. The device 62 is connected to the control module 42 by a wire 64. The control module 42 is capable of sending a signal over the wire 64 to operate the warning device 62. The operator warning device 62 may comprise one of many known warning devices such as a visual alarm, an audible alarm, or multiple alarms. The control module 42 is also connected to the valve 30 via an electrical wire 66. The control module 42 is capable of producing a control signal to control the opening and closing of the valve 30. Although not shown, it is also possible and contemplated to connect the control module 42 to the engine to monitor and control various operations and functions of the engine. For example, the control module 42 may modify the operation of the engine by de-rating the power output of the engine.

The SCR catalyst 60 is generally capable of reducing the $NO_x$ emissions so long as there is an appropriate amount urea solution present in the tank 12. However, prior art systems are unable to determine when the urea solution in the tank 12 has been depleted and filled with another less expensive liquid. In such systems, once urea has run out of the tank 12, an operator could simply either not fill the tank 12 or fill the tank with a substance that is less expensive than urea. This less expensive solution would not be effective in reducing the $NO_x$ emissions when introduced into the exhaust stream 36.

The operation of the emissions diagnostic system 10 is as follows. Urea solution, which is stored in the tank 12, is pumped by the urea pump 24 through he pressure regulator 28 to the valve 30. The urea solution is mixed with air from the air pump 32 in the valve 30 in order to atomize the urea solution. Mixing the urea solution with air produces a fine spray pattern. Additionally, the air is used to prevent the liquid urea from clogging the valve 30. The urea solution is then sprayed by the valve 30 into the exhaust gas stream 36 prior to entering the SCR catalyst 60. The urea solution undergoes a hydrolysis process and is decomposed into ammonia and $CO_2$. While the exhaust gas is passed through the SCR catalyst 60, the gaseous ammonia reacts with the $NO_x$ to reduce the $NO_x$ into molecular nitrogen. The sensor 56 is used to insure that the system 10 has not been tampered. For example, if the sensor 56 were removed then a preselected low level of $NO_x$ would be sensed. This low level would be interpreted by the control module 42 to mean that the integrity of the system 10 had been breached. The control module 42 would then take appropriate action when this condition is sensed.

The level sensor 38, as previously described, is used to monitor the level of urea in the tank 12. The sensor 38 will signal the control module 42 if the level of urea in the tank 12 falls below the necessary amount of urea. The control module 42 will warn the operator of this situation by turning on the appropriate operator warning device 62. This will indicate to the operator that the tank 12 needs to be refilled within a certain period of time or miles traveled. If, for some reason, the operator is not able to refill the tank 12, the control module 42 would be capable of de-rating the compression ignition engine to a safe minimum level until the tank 12 is filled. The temperature sensor 40 is used to determine if the tank 12 is at or above a preselected temperature which prevents the urea from freezing in the tank 12. If the temperature remains below the freezing point for urea for a predetermined period of time, then the operator would be warned of this condition by the control module 42 operating the warning device 62. The operator would be given a preselected time period to correct this malfunction. If the temperature of the tank 12 is below the specified freezing temperature for urea after an adequate warning period and correction time period, the control module 42 would de-rate the compression ignition engine to a safe minimum level until the temperature reading from the sensor 40 exceeds the freezing temperature.

The sensor 48 is capable of sensing the pressure of the urea solution after the urea pump 24. The sensor 48 is used to assure proper operation of the pump 24 and also to determine if use of the pump 24 is necessary or required. If the sensor 48 senses pressures below the specified level needed to properly spray urea into the exhaust gas stream 36, then the control module 42 would warn the operator of this condition by operation of the operator warning device 62. The operator would be provided a predetermined time period in which to correct the malfunction of the pump 24. If the pressure is still below the specified pressure after an adequate warning and correction period, then the engine would be de-rated by the control module 42 to a safe minimum level until pressure readings from the sensor 48 exceeded the desirable pressure.

The sensor 52 is used to monitor the pressure after the air pump 32. The sensor 52 is employed to assure proper pump 32 operation and to decide if the use of the pump 32 is necessary. If the sensor 52 senses pressures below a specified level needed to properly spray urea into the exhaust gas stream 36, then the control module 42 would operate the warning device 62 to indicate to the operator of the problem. The operator would then be provided a preselected time period in which to correct the sensed problem. If the pressure is still below the specified pressure after an adequate warning and correction period the control module 42 would de-rate the engine to a safe minimum level until an adequate pressure was sensed by the sensor 52.

As noted above, the sensor 56 is used to continually monitor the levels of $NO_x$ being emitted by the SCR catalyst 60. Any variation above the specified $NO_x$ level during normal engine conditions would be signaled by the warning device 62 to the operator. The operator would be provided an adequate time period in which to correct the malfunction. If the $NO_x$ level is still above the specified limit after the adequate warning period and correction time expires, then the control module 42 would de-rate the engine to a safe minimum level until the sensor 56 indicates that the $NO_x$ level is below the specified limits.

All of the sensors 38, 40, 48, 52, and 56 would be continually monitored by the control module 42 to determine if there is any electrical malfunction. If a malfunction is determined in any of the sensors 38, 40, 48, 52, or 56 then the operator would be warned of the fault via the warning device 62. The operator would be provided a period of time in which to service this malfunction. If the malfunctioning sensor is not corrected within an adequate warning and correction time, then the control module 42 would de-rate the engine until such time that the sensor is replaced.

Referring now to FIG. 2, a flowchart or program 100 of the software stored in the control module 42 and implemented in a preferred embodiment of the present invention is shown. Those skilled in the art can easily and readily develop the specific software code necessary to implement the flowchart or program 100 by using the specific instructions set associated with the microprocessor or microcontroller selected for use with the control module 42 of the present invention.

The program 100 begins at a step 102 in which the program 100 starts or begins operation. All of the sensors 38, 40, 48, 52, and 56 are then read by the control module 42 in a step 104. It is then determined by the control module 42 in a step 106 whether one or all of the sensors 38, 40, 48, 52, and 56 are within acceptable limits. For example, the sensor 38 would provide a signal indicative of the level of urea in the tank 12 and the control module 42 would determine if this sensed or monitored level is an acceptable level. Additionally, in the step 106 it could be determined whether any one of the sensors 38, 40, 48, 52, or 56 was functioning properly, i.e., whether one of the sensors 38, 40, 48, 52, or 56 was open or shorted. If it is determined in the step 106 that any of the sensors 38, 40, 48, 52, or 56 provided a reading not within acceptable limits then control of the program 100 proceeds to a step 108. In the step 108 the control module 42 initiates operation of the operator warning device 62 to alert the operator of a malfunction or potential problem. Once the warning device 62 is activated a timer is started as is shown in a step 110. After the step 110, the program passes to a step 112 in which it is determined whether the malfunction has been corrected.

If it is determined that the malfunction has not been corrected, control of the program 100 proceeds to a step 114. In the step 114, another decision is made as to whether the timer has now reached a point which is greater than a predetermined time period. If it is decided in the step 114 that the timer has indeed reached such time period than the operation of the engine is modified by the control module 42, as is shown in a step 116. Otherwise, the program 100 branches back to the step 112 to again determine if the malfunction has been corrected. The control module 42 is used to de-rate the engine to a safe level of operation by the step 116. After modification of the engine, the program 100 continues to a step 118 in which control of the program 100 is returned to the routine which called the program 100.

In the step 106 if it is determined that the sensors 38, 40, 48, 52, and 56 are providing readings within acceptable or predetermined limits then control of the program 100 branches to the step 118. Additionally, in the step 112 if the outcome is that the malfunction has been corrected, then control of the program 100 will pass to the step 118.

INDUSTRIAL APPLICABILITY

It is more expensive to run a compression ignition engine with an urea and SCR system then it is to run a compression ignition engine without such a system. One recurring additional cost is the purchase of the urea, which is depleted as the engine runs and must be replenished. Unscrupulous vehicle operators might attempt to circumvent the SCR system used on an engine to reduce operating costs, but at the expense of increased emissions. One way an operator accomplish this is to allow the urea solution to run out and simply not re-fill the tank 12. Another way might be to fill the tank 12 with a substance that does not produce the desired gas mixture to complete the SCR reaction.

An embodiment of the present invention, monitors various operations of an emissions control system to determine if the SCR reaction is being completed to thereby reduce $NO_x$ emissions. Additionally, the present invention is used to determine if the urea storage tank has been filled with something other than the desired substance. In either event, the control module 42 will cause the operator warning device 62 to warn the operator of a malfunction or a breach of the system 10. If the operator does not correct the problem within a predetermined time period, then the control module 42 is capable of modifying the operation of the engine, which in a preferred embodiment includes de-rating the output power of the engine. By using an embodiment of the present invention, the operator is less likely to be able to defeat or tamper with the $NO_x$ reducing capabilities of an SCR system using an urea solution.

What is claimed is:

1. An emissions diagnostic system for a compression ignition engine having an exhaust gas stream directed into an SCR catalyst capable of reducing $NO_x$ in the exhaust gas stream, the system comprising:
   a tank for storing a solution of urea;
   a pump in fluid communication with the tank for drawing the solution of urea from the tank;
   a valve in fluid communication with the pump and the exhaust gas stream for receiving the solution of urea from the pump;
   an air pump connected to the valve for providing air into the valve for mixing with the solution of urea, the valve for spraying the solution of urea into the exhaust gas stream;
   a sensor for sensing the level of $NO_x$ emissions emitted by the SCR catalyst;
   a control module connected to the sensor for determining whether the level of $NO_x$ emissions is at an acceptable level; and
   a sensor associated with the air pump for sensing the air pressure being generated by the air pump, the sensor being connected to the control module for determining whether the sensed pressure is at an acceptable limit.

2. The system of claim 1 wherein the control module further comprises a timer for counting a predetermined time period once the control module has determined that the level of $NO_x$ emissions emitted by the SCR catalyst is below the acceptable level.

3. The system of claim 2 wherein the control module is connected to the compression ignition engine for modifying the operation of the engine once the timer has exceeded the predetermined time period.

4. An emissions diagnostic system for a compression ignition engine having an exhaust gas stream directed into an SCR catalyst capable of reducing $NO_x$ in the exhaust gas stream, the system comprising:
   a tank for storing a solution of urea;
   a pump in fluid communication with the tank for drawing the solution of urea from the tank;
   a valve in fluid communication with the pump and the exhaust gas stream for receiving the solution of urea from the pump;
   an air pump connected to the valve for providing air into the valve for mixing with the solution of urea, the valve for spraying the solution of urea into the exhaust gas stream;
   a sensor for sensing the level of $NO_x$ emissions emitted by the SCR catalyst;
   a control module connected to the sensor for determining whether the level of $NO_x$ emissions is at an acceptable level; and
   a sensor associated with the pump for sensing the pressure being generated by the pump, the sensor being connected to the control module for determining whether the sensed pressure is at an acceptable limit.

5. An emissions diagnostic system for reducing $NO_x$ emissions from an exhaust gas stream of a compression ignition engine, the exhaust gas stream being passed through an SCR catalyst effective for selective catalytic $NO_x$ reduction, the system comprising:
   a tank for storing a solution of urea, the tank further having a heat source to apply heat to the solution of urea;
   a pump connected to the tank for pumping the solution of urea from the tank;
   a valve connected to the pump and exhaust gas stream, the valve for receiving the solution of urea from the pump;
   an air pump connected to the valve for providing air into the valve for mixing with the solution of urea, the valve for controllably spraying the solution of urea into the exhaust gas stream;
   a sensor associated with an output of the SCR catalyst for sensing the level of $NO_x$ emissions emitted by the SCR catalyst;
   a controller connected to the sensor for determining whether the level of $NO_x$ emissions is within a predetermined range; and
   a sensor associated with the air pump for sensing the air pressure being generated by the air pump, the sensor being connected to the controller for determining whether the sensed pressure is at an acceptable limit.

6. An emissions diagnostic system for reducing $NO_x$ emissions from an exhaust gas stream of a compression ignition engine, the exhaust gas stream being passed through an SCR catalyst effective for selective catalytic $NO_x$ reduction, the system comprising:
   a tank for storing a solution of urea, the tank further having a heat source to apply heat to the solution of urea;
   a pump connected to the tank for pumping the solution of urea from the tank;
   a valve connected to the pump and exhaust gas stream, the valve for receiving the solution of urea from the pump;
   an air pump connected to the valve for providing air into the valve for mixing with the solution of urea, the valve for controllably spraying the solution of urea into the exhaust gas stream;
   a sensor associated with an output of the SCR catalyst for sensing the level of $NO_x$ emissions emitted by the SCR catalyst;
   a controller connected to the sensor for determining whether the level of $NO_x$ emissions is within a predetermined range; and
   a sensor associated with the pump for sensing the pressure being generated by the pump, the sensor being connected to the controller for determining whether the sensed pressure is at an acceptable limit.

7. The system of claim 6 wherein the controller further comprises a timer for counting a predetermined time period once the controller has determined that the level of $NO_x$ emissions emitted by the SCR catalyst is below the predetermined range.

8. The system of claim 7 wherein the controller is connected to the compression ignition engine for modifying the operation of the engine once the timer has exceeded the predetermined time period.

9. A method for determining an abnormal operating condition for a $NO_x$ emission reducton system for use with an exhaust gas stream associated with a compression ignition engine comprising:
   spraying a solution of urea into the exhaust gas stream via a pressurized gas;
   determining a pressure of the pressurized gas; and
   transmitting a warning signal when the pressure of the pressurized gas is outside a predetermined range for a first predetermined time.

10. The method of claim 9 further comprising the step of modifying operation of the engine if it is determined that the pressurized gas is outside a said predetermined range for a second predetermined time.

11. A method for determining an abnormal operating condition for a $NO_x$ emission reduction system for use with an exhaust gas stream associated with a compression ignition engine comprising:

pressurizing a solution of urea;

spraying said solution of urea into the exhaust gas stream via a pressurized gas;

determining a pressure of the urea solution; and transmitting a warning signal when the pressure of the urea solution is outside a predetermined range for a first predetermined time.

12. The method of claim 11 further comprising the step of modifying operation of the engine if it is determined that the urea solution is outside said predetermined range for a second predetermined time.

* * * * *